(12) United States Patent
Barkhurst et al.

(10) Patent No.: US 12,165,150 B2
(45) Date of Patent: Dec. 10, 2024

(54) SYSTEMS AND METHODS FOR SECURING DATA USING A TOKEN

(71) Applicant: MASTERCARD INTERNATIONAL INCORPORATED, Purchase, NY (US)

(72) Inventors: James W. Barkhurst, Fenton, MO (US); Christopher T. Scholl, St. Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 3 days.

(21) Appl. No.: 17/138,395

(22) Filed: Dec. 30, 2020

(65) Prior Publication Data

US 2022/0207534 A1 Jun. 30, 2022

(51) Int. Cl.
G06Q 40/00 (2023.01)
G06F 21/62 (2013.01)
G06Q 20/40 (2012.01)

(52) U.S. Cl.
CPC ..... *G06Q 20/4014* (2013.01); *G06F 21/6263* (2013.01)

(58) Field of Classification Search
CPC ............ G06Q 20/4014; G06Q 21/6263
USPC .......................................................... 705/44
See application file for complete search history.

(56) References Cited

U.S. PATENT DOCUMENTS

| | | | |
|---|---|---|---|
| 6,957,770 B1 | 10/2005 | Robinson | |
| 7,043,754 B2 | 5/2006 | Arnouse | |
| 7,231,068 B2 | 6/2007 | Tibor | |
| 7,905,396 B2 | 3/2011 | Tidwell et al. | |
| 8,052,040 B2 | 11/2011 | Stover | |
| 8,620,812 B2 | 12/2013 | Callahan et al. | |
| 2004/0258281 A1 | 12/2004 | Delgrosso et al. | |
| 2010/0299258 A1 | 11/2010 | Page | |
| 2013/0036058 A1* | 2/2013 | Kelly | G06Q 20/3823 705/67 |
| 2014/0229388 A1* | 8/2014 | Pereira | G06Q 20/20 705/76 |
| 2015/0120536 A1* | 4/2015 | Talker | G06Q 20/367 705/39 |

(Continued)

FOREIGN PATENT DOCUMENTS

WO 2016164648 A1 10/2016

*Primary Examiner* — Olabode Akintola
(74) *Attorney, Agent, or Firm* — Armstrong Teasdale LLP

(57) ABSTRACT

Provided herein is a computing system for electronically transmitting a token linked to personally identifying information (PII) of a user to a merchant. The computing system includes a processor in communication at a memory device, and the processor is programmed to: (i) receive PII, issued payment instrument data, and a user identifier associated with a user, (ii) store the PII, issued payment instrument data, and user identifier in the memory device, (iii) receive an identification request for a user associated with a transaction including payment instrument data, (iv) perform a lookup in the memory device to retrieve the PII of the user and the stored user identifier associated with the received payment instrument data, (v) receive a user input identifier from the user to authenticate the user, (vi) generate a token that links the PII of the user to the transaction, and (vii) transmit the token to the merchant.

20 Claims, 9 Drawing Sheets

(56) References Cited

U.S. PATENT DOCUMENTS

| | | | |
|---|---|---|---|
| 2016/0125412 A1* | 5/2016 | Cannon | G06Q 20/4014 |
| | | | 705/44 |
| 2018/0089461 A1* | 3/2018 | Williams | G06Q 20/3829 |
| 2018/0150832 A1 | 5/2018 | Badal-Badalian et al. | |
| 2019/0147515 A1* | 5/2019 | Hurley | G06Q 20/3821 |
| | | | 705/44 |
| 2020/0311726 A1 | 10/2020 | Song et al. | |
| 2020/0320516 A1* | 10/2020 | Royyuru | G06Q 20/3674 |
| 2020/0327540 A1 | 10/2020 | Chavarria et al. | |
| 2021/0224788 A1* | 7/2021 | Kurylko | G06Q 20/3552 |
| 2022/0036345 A1* | 2/2022 | Young | G06Q 20/385 |

* cited by examiner

SYSTEMS AND METHODS FOR SECURING DATA USING A TOKEN

BACKGROUND

The field of the present disclosure relates generally to securing personally identifiable information associated with a user by using a token, and more specifically, to electronically providing a token to a merchant as part of a check transaction, wherein the token is electronically linked to personally identifiable information of a user associated with the check.

When a user uses a payment instrument, such as a check or an electronic check (e-check), at least some merchants may require additional information from the user before the merchant processes the payment transaction (e.g., in case the check cannot be processed and/or is returned for insufficient funds, a/k/a, "bounces"). For example, some merchants may require that a user write their driver's license number or last four digits of their social security number on a check before the merchant processes the check. Further, some checks may be equipped with a bar code such that merchants can scan the bar code to view the information of the user and write the information on the check.

With these existing systems, users may be providing merchants sensitive, personally identifying information. If merchants do not securely store and/or properly delete such information when the merchants are through using the information, the sensitive information of the users may be easily stolen or compromised in other ways. Accordingly, these known systems for processing checks do not offer ways for sensitive information of users to be securely provided to merchants such that the information of the users is secure and the merchants are able to use said information if needed.

BRIEF DESCRIPTION

In one aspect, a computing system for electronically transmitting a token linked to personally identifying information (PII) of a user to a merchant is provided. The computing system includes at least one processor in communication with at least one memory device, and the at least one processor is programmed to: (i) receive, from an issuer computing device, PII, issued payment instrument data, and a user identifier associated with a user, (ii) store the PII, issued payment instrument data, and user identifier associated with the user in the memory device, (iii) receive, from a merchant computing device, an identification request for a user associated with a transaction, the identification request including payment instrument data associated with a check used in the transaction, (iv) perform a lookup in the memory device to retrieve the PII of the user from the memory device and the stored user identifier associated with the received payment instrument data, (v) receive a user input identifier from the user to authenticate the user, (vi) in response to authenticating the user, generate a token that links the PII of the user to the transaction, and (vii) transmit the token to the merchant computing device.

In another aspect, a method for using a computing system to electronically transmit a token linked to personally identifying information (PII) of a user to a merchant is provided. The computing system includes at least one processor in communication with at least one memory device, and the method includes: (i) receiving, from an issuer computing device, PII, issued payment instrument data, and a user identifier associated with a user, (ii) storing the PII, issued payment instrument data, and user identifier associated with the user in the memory device, (iii) receiving, from a merchant computing device, an identification request for a user associated with a transaction, the identification request including payment instrument data associated with a check used in the transaction, (iv) performing a lookup in the memory device to retrieve the PII of the user from the memory device and the stored user identifier associated with the received payment instrument data, (v) receiving a user input identifier from the user to authenticate the user, (vi) in response to authenticating the user, generating a token that links the PII of the user to the transaction, and (vii) transmitting the token to the merchant computing device.

In yet another aspect, at least one non-transitory computer-readable media having computer-executable instructions thereon for electronically transmitting a token linked to personally identifying information (PII) of a user to a merchant using a computing system including at least one processor in communication with at least one memory device is provided. When executed by the at least one processor, the computer executable instructions cause the at least one processor to: (i) receive, from an issuer computing device, PII, issued payment instrument data, and a user identifier associated with a user, (ii) store the PII, issued payment instrument data, and user identifier associated with the user in the memory device, (iii) receive, from a merchant computing device, an identification request for a user associated with a transaction, the identification request including payment instrument data associated with a check used in the transaction, (iv) perform a lookup in the memory device to retrieve the PII of the user from the memory device and the stored user identifier associated with the received payment instrument data, (v) receive a user input identifier from the user to authenticate the user, (vi) in response to authenticating the user, generate a token that links the PII of the user to the transaction, and (vii) transmit the token to the merchant computing device.

BRIEF DESCRIPTION OF THE DRAWINGS

FIG. 1 is a schematic diagram illustrating an example multi-party check processing system that includes an authentication computing device for providing a token linked to the accountholder's personally identifiable information.

FIG. 2 is a schematic of a check that may be used in a financial transaction, such as the transaction described in FIG. 1.

FIG. 3 is a block diagram of an example authentication platform used for electronically sending personally identifying information of a user to a merchant in accordance with one example embodiment of the present disclosure.

FIG. 4 illustrates an example configuration of a client system in accordance with one embodiment of the present disclosure.

FIG. 5 illustrates an example configuration of a server computing device in accordance with one embodiment of the present disclosure.

FIG. 6 is a simplified flow diagram of electronically sending personally identifying information of a user to a merchant in accordance with one example embodiment of the present disclosure.

FIG. 7 is a simplified flow diagram of authenticating a payor in a user-to-user check transaction in accordance with one example embodiment of the present disclosure.

FIG. 8 is a flowchart of an example process for electronically providing a token to a merchant as part of a check transaction in accordance with one embodiment of the disclosure.

FIG. 9 is a diagram of components of one or more example computing devices that may be used in the authentication platform shown in FIG. 3.

The following detailed description of the embodiments of the disclosure refers to the accompanying drawings. The same reference numbers in different drawings may identify the same or similar elements.

DETAILED DESCRIPTION

Figure 1:
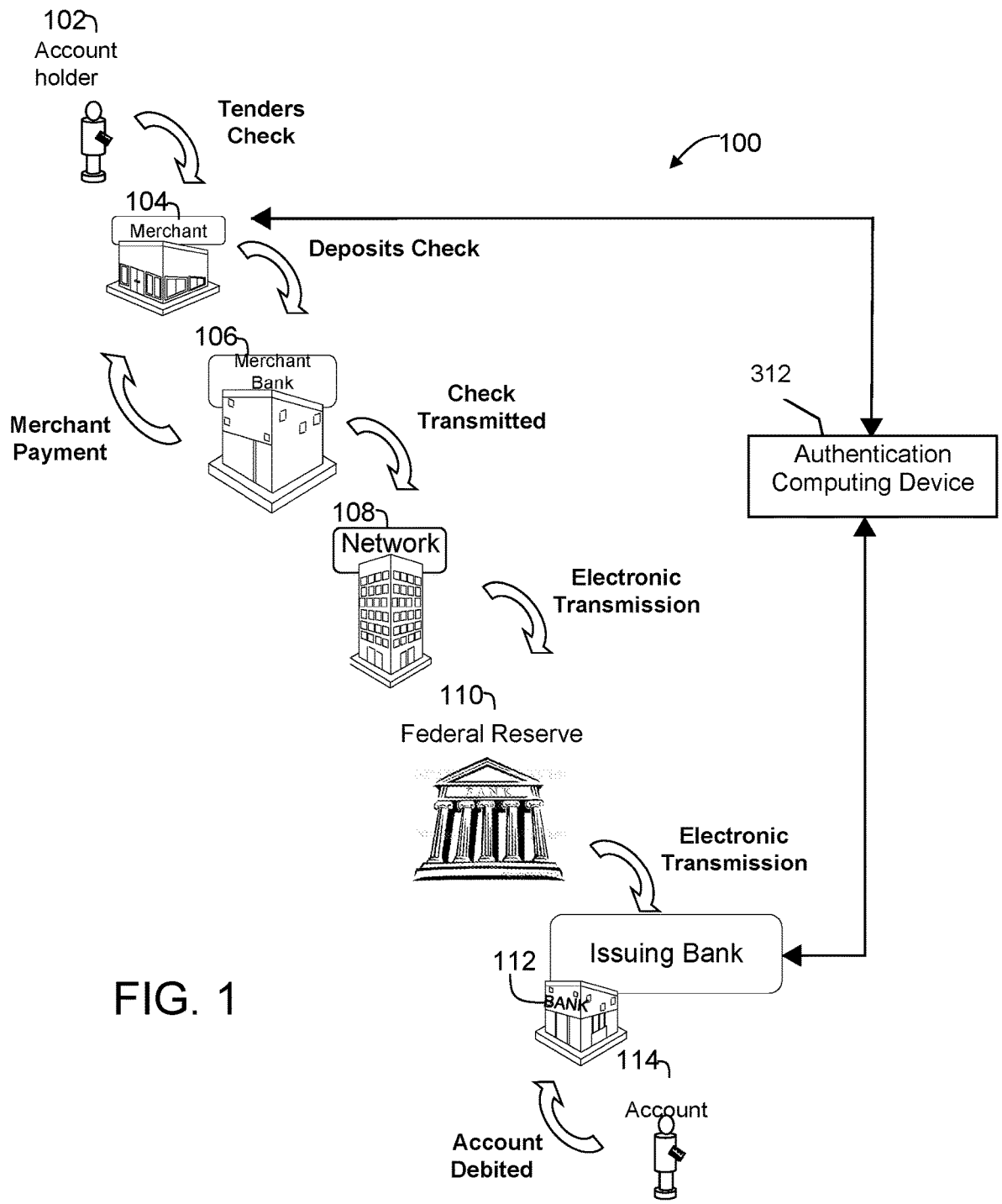
FIGS. 1-9 show example embodiments of the methods and systems described herein.

The systems and methods described herein are configured to electronically transmit a token linked to personally identifying information of users to merchants during a payment transaction. The systems and methods described herein are also configured to authenticate the users associated with the payment transaction while the payment transaction is being processed. In some embodiments, the systems and methods described herein may be implemented by an authentication computing device. In an example embodiment, the payment transactions involve a payment instrument such as a check.

Specifically, the systems and methods described herein are configured to electronically transmit the token linked to personally identifying information (PII) of users to merchants when the users initiate transactions with the merchants using a check. Check transactions can take multiple days to process and require the payment account associated with the checks to have sufficient funds for the transactions to be successfully processed (e.g., authorized, cleared, and funds transferred). Further, the only way for merchants to authenticate users associated with check transactions is through the user presenting PII (e.g., a driver's license or other form of identification). Accordingly, merchants generally require the users to present PII to the merchants such that the merchants can contact the user or file a claim against the user if the transaction cannot be processed. In these known processes, the merchants may require the users to write PII on the check and/or present the PII for the merchant to enter and store (e.g., in a merchant database). The physical presentation of PII in these known processes increases the likelihood of the PII getting stolen or being used fraudulently.

The systems and methods described herein address the limitations and failures of these known systems and processes. The authentication computing device electronically transmits a token linked to the PII of users to the merchants and authenticates the users as the transactions are being processed without the users having to present PII to the merchant. Accordingly, the authentication computing device decreases the likelihood of the PII getting stolen or being used fraudulently (e.g., improving data security) and reduces the number of processed fraudulent transactions (e.g., improving system bandwidth), while still ensuring that the merchants can contact users if the transactions cannot be successfully processed.

The authentication computing device receives, from issuers of issued payment instruments, (i) personally identifiable information (PII), (ii) issued payment instrument data (e.g., associated with issued checks), and (iii) user identifier data. The PII includes information that can be used on its own or with other information to identify, contact, or locate a single person, or to identify an individual in context. For example, the PII includes a user name, a user address, a user driver's license number, a user phone number, and/or a user social security number. Issued payment instrument data includes issued account numbers and issued check numbers that identify payment accounts that may be used in making a payment to a merchant or other party. User identifier data includes user identifiers that can be used to verify users including personal identification numbers (PINs) and biometric data (e.g., fingerprint data, face scan data, and retina scan data). In some embodiments, the authentication computing device links the PII, user identifier data, and issued payment instrument data, and stores the linked PII, user identifier data, and issued payment instrument data for each user within a memory device (e.g., a database) in communication with the authentication computing device.

When a user uses a payment instrument at a merchant to initiate a transaction, the merchant transmits the payment instrument data to the authentication computing device (e.g., through taking a picture of the payment instrument, scanning the payment instrument, etc.). The authentication computing device performs a lookup of the received payment instrument data (e.g., an account number) in the memory device that stores the linked PII, user identifier data, and issued payment instrument data to retrieve the PII and determine the user associated with the issued payment instrument. The authentication computing device retrieves the PII, generates a token for the PII, and stores the token in the memory device. The authentication computing device prompts the determined user, either through an application on a user computing device of the user or a point of sale (POS) device of the merchant, to enter a user identifier or biometric data (e.g., a PIN or biometric data). The user identifier is transmitted to the authentication computing device, and the authentication computing device compares the received user identifier to the stored a sample user identifier.

The authentication computing device also authenticates users of user-to-user transactions (e.g., payor-to-payee transactions) associated with a payment instrument (e.g., a check). When a payee deposits a check (e.g., through an application on a payee computing device or through a financial institution of the payee), the authentication computing device authenticates a payor of the transaction (e.g., associated with the check). That is, the authentication computing device performs a lookup in a database associated with the authentication computing device to determine the payor associated with the check. The authentication computing device then prompts the payor to provide a user identifier or biometric data to authenticate the payor. The prompt includes a request for a PIN of the payor, biometric data of the payor, or other data from the payor to authenticate the payor and ensure that the payor is associated with the check of the payee (e.g., that the payor wrote the check). When the payor is authenticated, the check is processed as described herein.

If the received user identifier and the stored user identifier match, the authentication computing device authenticates the user of the payment instrument and transmits the payment method data to the issuer of the payment method for further processing (e.g., transaction authorization and clearing). In some embodiments, the authentication computing device then transmits the PII (or the token for the PII) of the authenticated user to the merchant. In other embodiments, the issuer of the payment method transmits the PII (or the token for the PII) of the authenticated user to the merchant.

At least one of the technical problems solved by the present disclosure includes: (i) unsecure presentation of personally identifiable information (PII) of users to merchants in check transactions, (ii) lack of verification of users in check transactions, (iii) long processing times for check transactions, (iv) inability to authenticate users in person-to-person check transactions, and/or (v) inability to selectively allow access to personally identifiable information to merchants.

At least one of the technical effects of the present disclosure includes: (i) enhanced security for users and merchants involved in check transactions, (ii) real-time or near-real-time verification of users of checks, (iii) faster processing times for check transactions due to the real-time or near-real-time user verification, (iv) reduction in fraudulent transactions due to the real-time or near-real-time user verification, (v) real-time or near-real-time authorization/clearing of check transactions, (vi) ability to authenticate users in person-to-person check transactions, and/or (vii) selectively allowing access to PII to merchants only when the check transactions are not successfully processed.

The methods and systems described herein may be implemented using computer programming or engineering techniques including computer software, firmware, hardware, or any combination or subset wherein a technical effect of the systems and processes described herein is achieved by performing at least one of the following steps: (i) receiving, from an issuer computing device, PII, issued payment instrument data, and a user identifier associated with a user, (ii) storing the PII, issued payment instrument data, and user identifier associated with the user in the memory device, (iii) receiving, from a merchant computing device, an identification request for a user associated with a transaction, the identification request including payment instrument data associated with a check used in the transaction, (iv) performing a lookup in the memory device to retrieve the PII of the user from the memory device and the stored user identifier associated with the received payment instrument data, (v) receiving a user input identifier from the user to authenticate the user, (vi) in response to authenticating the user, generating a token that links the PII of the user to the transaction, and (vii) transmitting the token to the merchant computing device.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the capture and analysis of check transaction data.

FIG. 1 is a schematic diagram illustrating an example multi-party check processing system 100 for enabling payment-by-check transactions in which an account holder 102 makes a check payment to a merchant 104 (also known as an originating merchant), and the check is drawn to an account issued by an issuing bank 112. A check, as used in such a payment transaction, is a form of a bill of exchange. A check is typically a written order from one person (the payor) to another (the payee), signed by the payor, and requiring the bank at which the payor holds a checking account to pay on demand or at some fixed future date, a certain sum of money, to either the person identified as payee or to any person presenting the check, such as the bank at which the payee holds an account. Checks can be either paper or electronic. A paper check is a physical written instrument. An electronic check (also known as an eCheck) is an electronic form of a paper check. An electronic check can be used and processed similarly to a paper check.

In one embodiment, the customer or account holder 102 pays a bill of sale at the merchant 104 using a paper check. In such a case, the customer 102 is considered the payor and the merchant 104 is the payee. Generally, the customer 102 also provides the merchant 104 with identification and/or contact information in case a check is returned as nonpayable. However, in the exemplary embodiment, the merchant 104 is in communication with an authentication computing device 312, and the authentication computing device 312 provides the identification and/or contact information (e.g., the personally identifiable information, or PII) in case the check is returned as non-payable, as described further herein. The merchant 104 then deposits the check to a merchant bank 106, which is a bank at which the merchant 104 holds an account. Typically, at the end of the business day, the merchant 104 deposits the check, along with all other checks received that day.

In some embodiments, the authentication computing device 312 may be in communication with the merchant bank 106 and may electronically deposit the check from the merchant 104. After the merchant bank 106 posts the value of the check to the merchant's account, the merchant bank 106 sends the check to a network 108 for processing of the check (e.g., an automated clearing house (ACH) 108). One example of an automated clearing house 108 is the National Automated Clearing House Association (NACHA).

The ACH 108 sorts all received checks according to the issuing bank 112, which is a bank at which the customer 102 holds an account 114. In the case of paper checks, the ACH 108 also scans each check to generate an electronic image and electronically transmits the electronic images to a Federal Reserve Bank 110. The ACH 108 also sends the paper checks to the issuing bank 112 associated with the account on which the check was drawn. The Federal Reserve Bank 110 receives the electronically transmitted check images from the ACH 108 and, in turn, electronically transmits the images to the issuing bank 112 associated with each check.

The issuing bank 112 then debits the customer's account 114 held at the issuing bank 112 and transfers the check amount to the merchant bank 106. In some embodiments, the authentication computing device 312 is in communication with the issuing bank 112, and the issuing bank 112 may authorize the check and start the process of debiting the customer's account 114 as soon as the check is received by the authentication computing device 312 (e.g., when the merchant 104 scans the check into authentication computing device 312).

In another embodiment, the customer or account holder 102 pays a bill of sale at a merchant 104 using an electronic check. The merchant 104 then transmits the electronic check to the ACH 108. The ACH 108 notifies the merchant bank 106 of the value of the check. The merchant bank 106 posts the value of the check to the merchant's account. The ACH 108 sorts all received checks according to the issuing bank 112. The ACH 108 transmits the electronic check to the Federal Reserve Bank 110. The Federal Reserve Bank 110 receives the electronic check from the ACH 108 and, in turn, transmits the electronic check to the issuing bank 112 associated with each check. The issuing bank 112 then debits the customer's account 114 held at the issuing bank 112 and transfers the check amount to the merchant bank 106. The electronic check may also be uploaded to the authentication computing device 312 from the merchant 104, and the authentication computing device 312 may work with the issuing bank 112 to process the electronic check and debits the customer's account 114.

Figure 2:
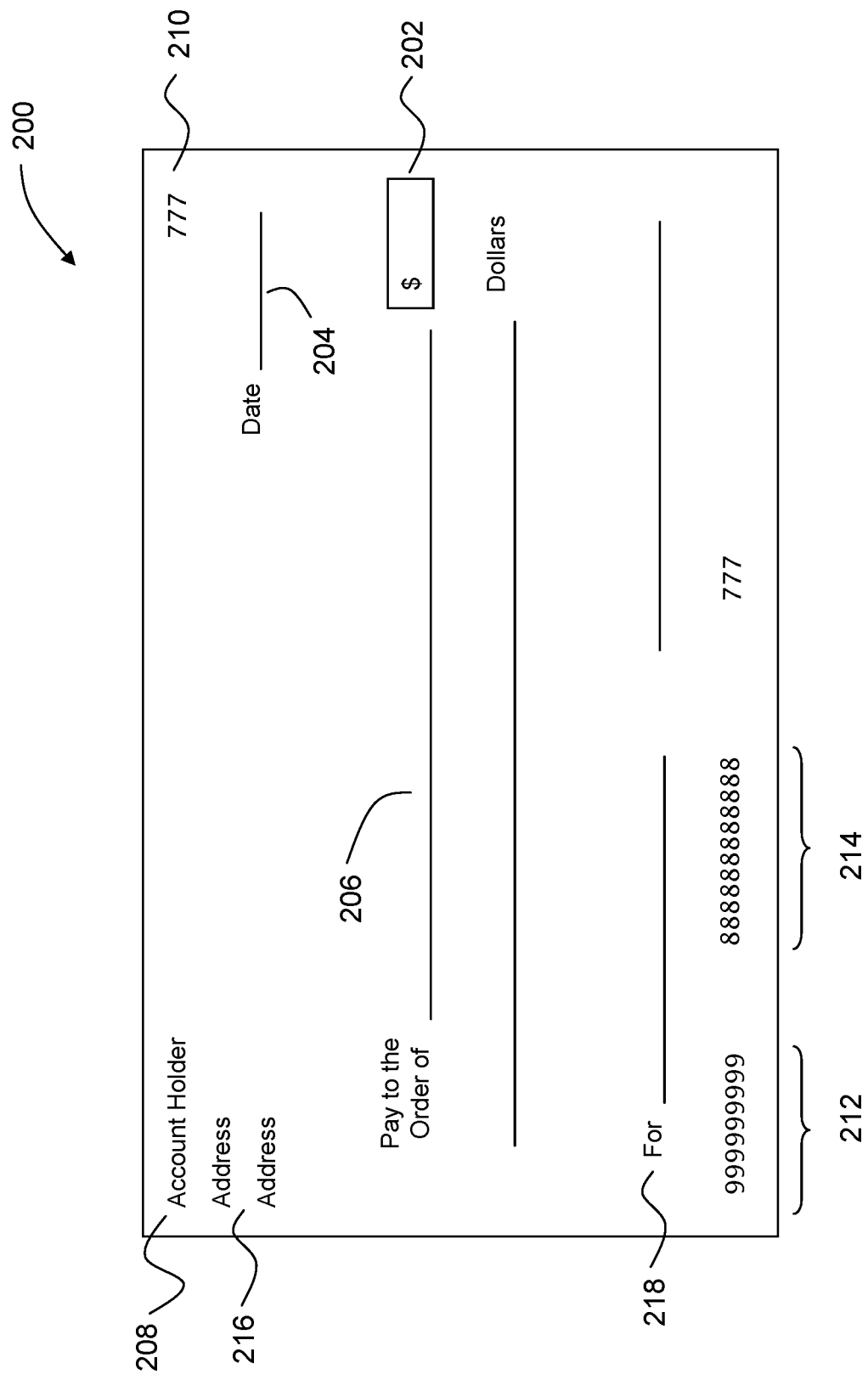

FIG. 2 is a schematic of a typical check 200 that may be used in a financial transaction, such as the transaction described in FIG. 1. Check 200 includes data relating to the transaction and data relating to the account on which check 200 is drawn. Transaction-related data includes, for example, a transaction amount 202, a transaction date 204, and a payee field 206. Account-related data includes, for example, an account holder's name 208, a check number 210, an issuing bank routing number 212, and an account number 214. Routing number 212 and account number 214 are applied to check 200 using magnetic ink such that a Magnetic Ink Character Recognition (MICR) reader is enabled to read numbers 212 and 214 during the process described above and shown in FIG. 1. Further check 200 also includes an address field 216, which contains the address of the account holder, and a memo field 218 for notes from the account holder.

In some embodiments, check 200 may not include account holder's name 208, routing number 212, account number 214, and/or address field 216. Instead, check 200 may include only a unique identifier that relates to the account holder and is stored by authentication computing device 312 (shown in FIG. 1). The merchant (e.g., merchant 106 shown in FIG. 1) associated with the financial transaction may scan check 200 and/or enter the unique identifier into authentication computing device 312 (shown in FIG. 1) to receive account holder's name 208, routing number 212, account number 214, address field 216, and/or any other identifying information. Accordingly, authentication computing device 312 may facilitate the cashing of check 200 without any personally identifying information (PII) or account information included on check 200.

Figure 3:
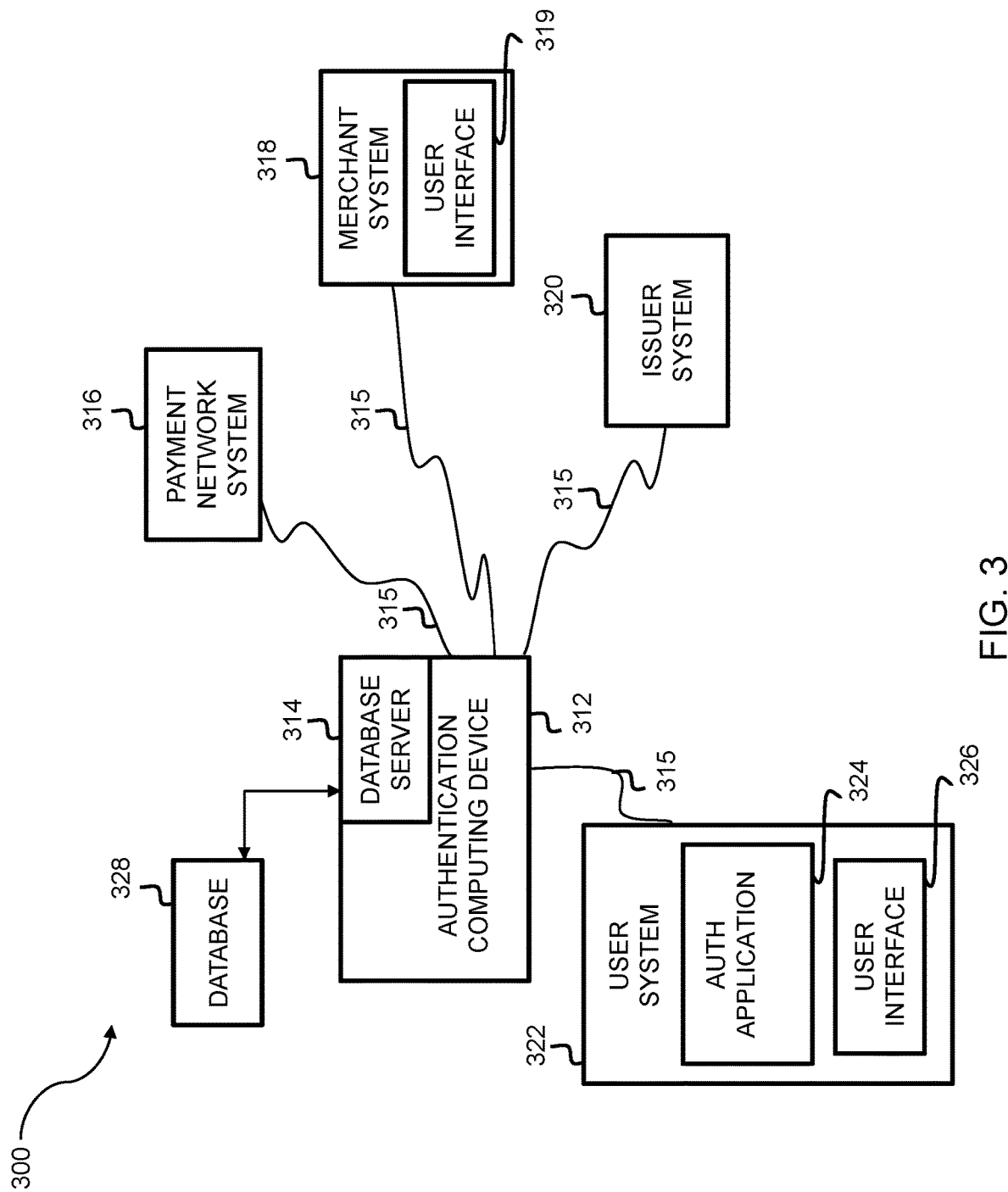

FIG. 3 is an expanded block diagram of an example embodiment of an authentication platform 300 that includes an authentication computing device 312 in accordance with one example embodiment of the present disclosure. In the example embodiment, platform 300 is used for electronically sending personally identifying information (PII) of a user (e.g., associated with client system 322) to a merchant (e.g., associated with merchant system 318), as described herein.

More specifically, in the example embodiment, platform 300 includes authentication computing device 312, and a plurality of client sub-systems connected to authentication computing device 312. Client sub-systems include a merchant system 318 (also referred to as merchant computing device 318), an issuer system 320 (also referred to as issuer computing device 320), and a user system 322 (also referred to as user computing device 322). In one embodiment, client sub-systems 318, 320, and 322 are computers including a web browser, such that authentication computing device 312 is accessible to client sub-systems 318, 320, and 322 using the Internet and/or using network 315. Client sub-systems 318, 320, and 322 are interconnected to the Internet through many interfaces including a network 315, such as a local area network (LAN) or a wide area network (WAN), dial-in-connections, cable modems, special high-speed Integrated Services Digital Network (ISDN) lines, and RDT networks. Merchant system 318 includes systems associated with merchants 104 (shown in FIG. 1) as well as external systems used to store data. For example, merchant system 318 may be a POS device communicatively coupled to an external system of merchants 104. Issuer system 320 includes systems associated with issuer banks 112 (shown in FIG. 1) as well as external systems used to store data. User system 322 includes systems associated with account holders 102 (shown in FIG. 1) as well as external systems used to store data. Authentication computing device 312 is also in communication with a payment network system 316 (also referred to as a payment network server 316) associated with processing network 108 (shown in FIG. 1) using network 315. Further, client sub-systems 318, 320, and 322 may additionally communicate with processing network 108 using network 315. Client sub-systems 318, 320, and 322 could be any device capable of interconnecting to the Internet including a web-based phone, PDA, or other web-based connectable equipment.

A database server 314 is connected to database 328, which contains information on a variety of matters, as described below in greater detail. In one embodiment, centralized database 328 is stored on authentication computing device 312 and can be accessed by potential users at one of client sub-systems 318, 320, and 322 by logging onto authentication computing device 312 through one of client sub-systems 318, 320, and 322. Access to centralized database 328 is controlled by authentication computing device 312 to limit the display of data to authorized users enrolled with authentication computing device 312. In an alternative embodiment, database 328 is stored remotely from authentication computing device 312 and may be non-centralized. Database 328 may be a database configured to store information used by authentication computing device 312 including, for example, user PII, issued payment instrument data, user identifier data, transaction data, merchant data, issuer data, and/or other data.

Database 328 may include a single database having separated sections or partitions, or may include multiple databases, each being separate from each other. In some embodiments, database 328 stores transaction data generated over the processing network including data relating to merchants, consumers, account holders, prospective customers, issuers, acquirers, and/or purchases made. In additional embodiments, database 328 also stores account data including at least one of a cardholder name, a cardholder address, one or more primary account numbers (PANs), other account identifiers, and transaction information. Database 328 may also store merchant information including a merchant identifier that identifies each merchant registered to use the network.

In the example embodiment, merchant system 318 includes a user interface 319, and user system 322 includes a user interface 326. User interfaces 319 and 322 may include a graphical user interface with interactive functionality, such that account holders 102 may be prompted to enter user validation into authentication computing device 312 through user interfaces 319 and/or 322, and such that account holders 102 may enter the user validation into authentication computing device 312. Further, users of merchant system 318 and/or user system 322 may interact with user interfaces 319 and 326 to view, edit, and otherwise interact with the user validation information and other transaction information. Authentication computing device 312 may be supported by processing network 108 and/or may process transaction data.

User interface 326 is also used, for example, to receive notifications from authentication computing device 312 and/or to confirm/correct user validation or payment instrument information. In some embodiments, user system 322 may include an authentication application 324. Authentication application 324 may be, for example, a program or application that runs on user system 322.

In some embodiments, issuer system 320 further includes an enrollment component for enrolling users with a user and payment verification service provided through authentication computing device 312. Enrollment data (e.g., initial username, initial password, cardholder information, issued payment instruments, etc.) is transmitted by issuer system 320 to authentication computing device 312. For example, a user may access a webpage hosted by issuer system 320 and access an application running on user system 322 to generate enrollment login information (e.g., username and password) and transmit the enrollment information to authentication computing device 312. In other embodiments, issuer system 320 may automatically enroll the user in user and payment verification service when issuer system 320 issues a payment instrument (e.g., checks and/or e-checks) to the user. In these embodiments, issuer system 320 may automatically generate and transmit the enrollment login information to the user. Authentication application 324 stores the received login information data in a database of login information (e.g., in database 328). In some embodiments, Authentication application 324 may display a log-in page for receiving initial login information. Authentication application 324 compares the candidate login information to the database of login information and determines if the candidate login information (e.g., username and password) matches the login information data stored in the database of login information.

In alternative embodiments, authentication application 324 is accessed remotely by user system 322. Authentication application 324 may be hosted by or stored on authentication computing device 312 and accessed by user system 322. For example, authentication application 324 may be stored on and executed by authentication computing device 312. User system 322 may provide inputs to authentication computing device 312 via network 315 which are used by authentication computing device 312 to execute authentication application 324. In one embodiment, these inputs may be received by a website hosted by authentication computing device 312. The website may further provide output to user system 322. The user system 322 used by the user has access to a website (e.g., hosted by authentication computing device 312), application (e.g., authentication application 324), or other tool which the user uses to input user validation, manage payment instruments, and/or otherwise interact with authentication computing device 312.

Figure 4:
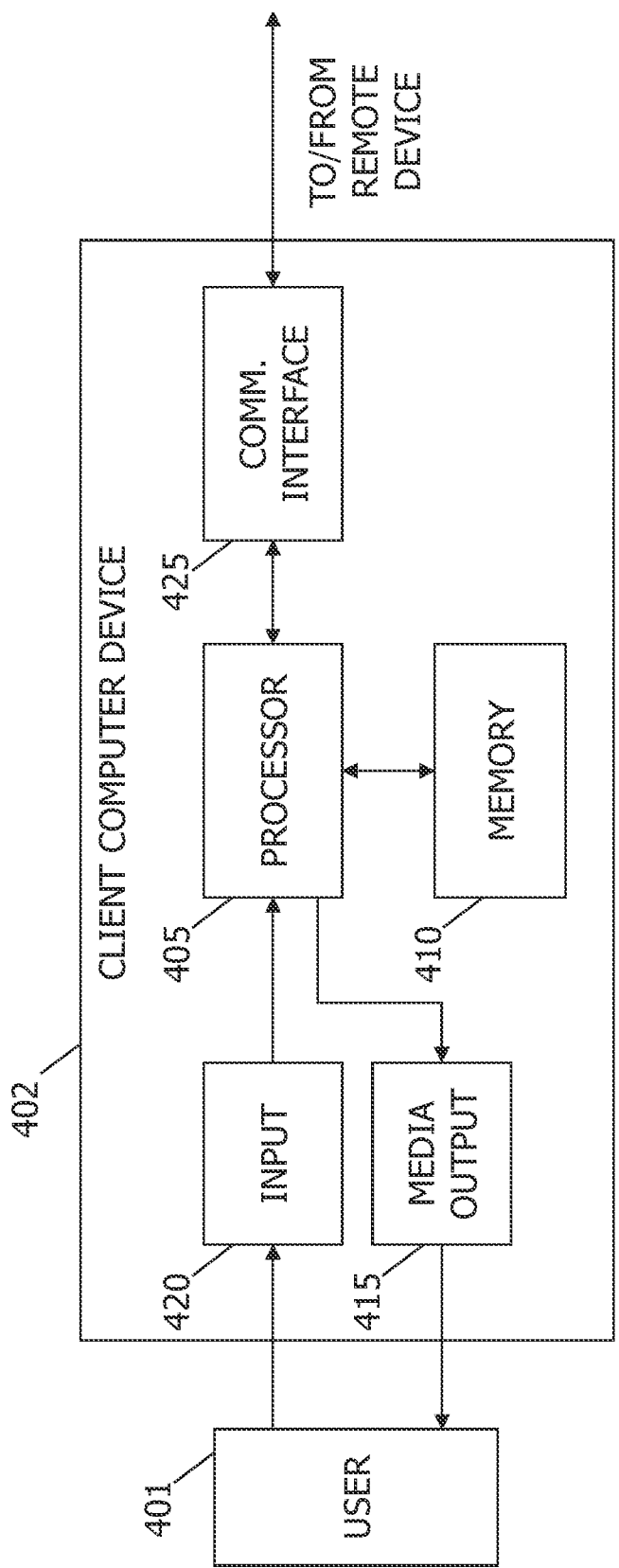

FIG. 4 illustrates an example configuration of a user computer device 402 in accordance with one embodiment of the present disclosure. User computer device 402 is operated by a user 401. User computer device 402 may be used to enter user validation into and/or otherwise interact with authentication computing device 312 (shown in FIG. 3). User computer device 402 may include, but is not limited to, client sub-systems 318, 320, and 322 (shown in FIG. 3). User computer device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or transaction data to be stored and retrieved. Memory area 410 may include one or more computer readable media.

User computer device 402 also includes at least one media output component 415 for presenting information to user 401. Media output component 415 is any component capable of conveying information to user 401. In some embodiments, media output component 415 includes an output adapter (not shown) such as a video adapter and/or an audio adapter. An output adapter is operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 415 is configured to present a graphical user interface (e.g., a web browser and/or a client application) to user 401. A graphical user interface may include, for example, an online store interface for viewing and/or purchasing items, and/or a wallet application for managing payment information. In some embodiments, user computer device 402 includes an input device 420 for receiving input from user 401. User 401 may use input device 420 to, without limitation, select and/or enter one or more items to purchase and/or a purchase request, or to access credential information, and/or payment information. Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as authentication computing device 312 (shown in FIG. 3). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from authentication computing device 312. A client application allows user 401 to interact with, for example, authentication computing device 312. For example, instructions may be stored by a cloud service, and the output of the execution of the instructions sent to the media output component 415.

Figure 7:
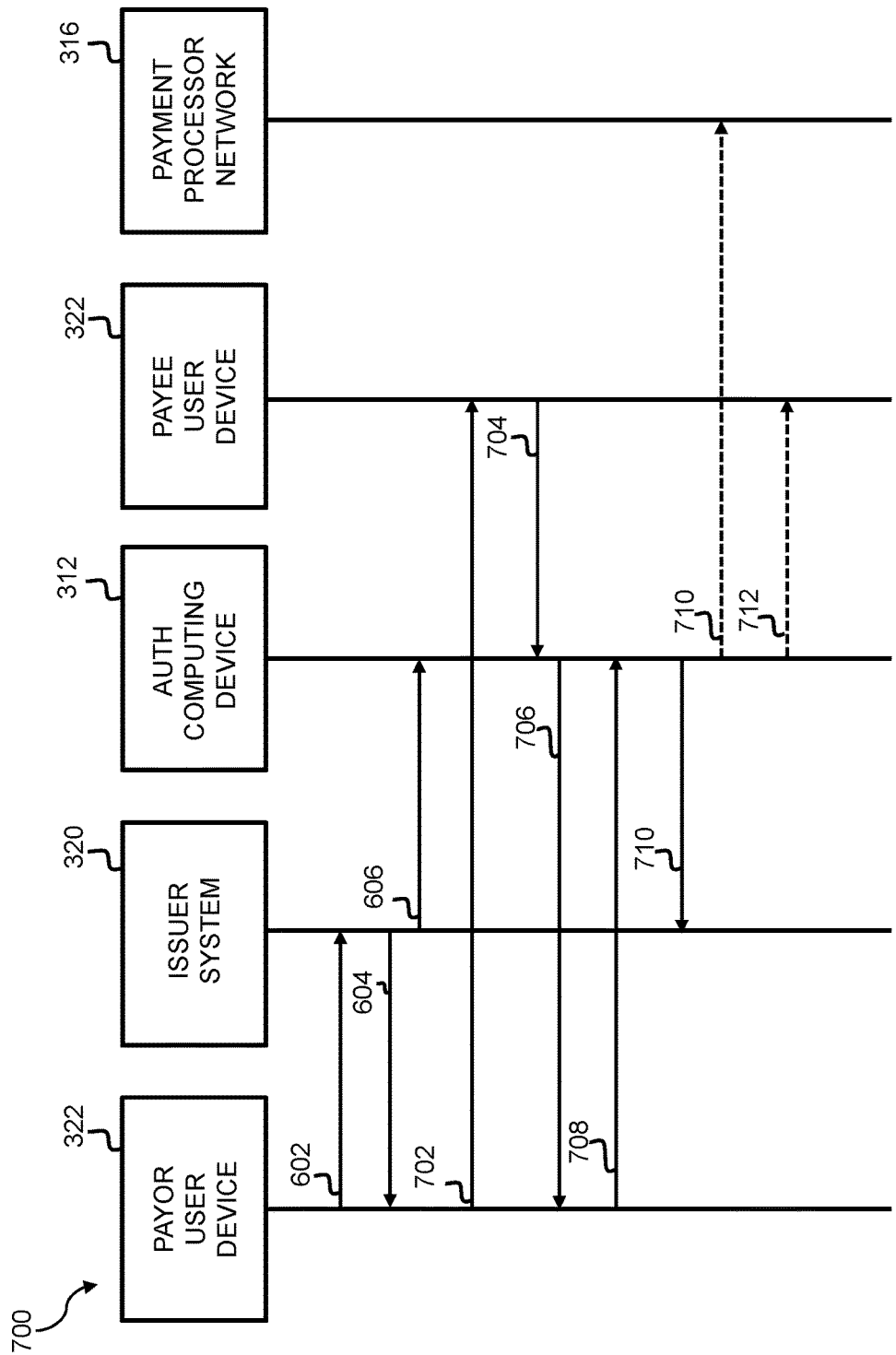

Processor 405 executes computer-executable instructions for implementing aspects of the disclosure. In some embodiments, the processor 405 is transformed into a special purpose microprocessor by executing computer-executable instructions or by otherwise being programmed. For example, the processor 405 is programmed with the instructions, such as illustrated in FIG. 7.

Figure 5:
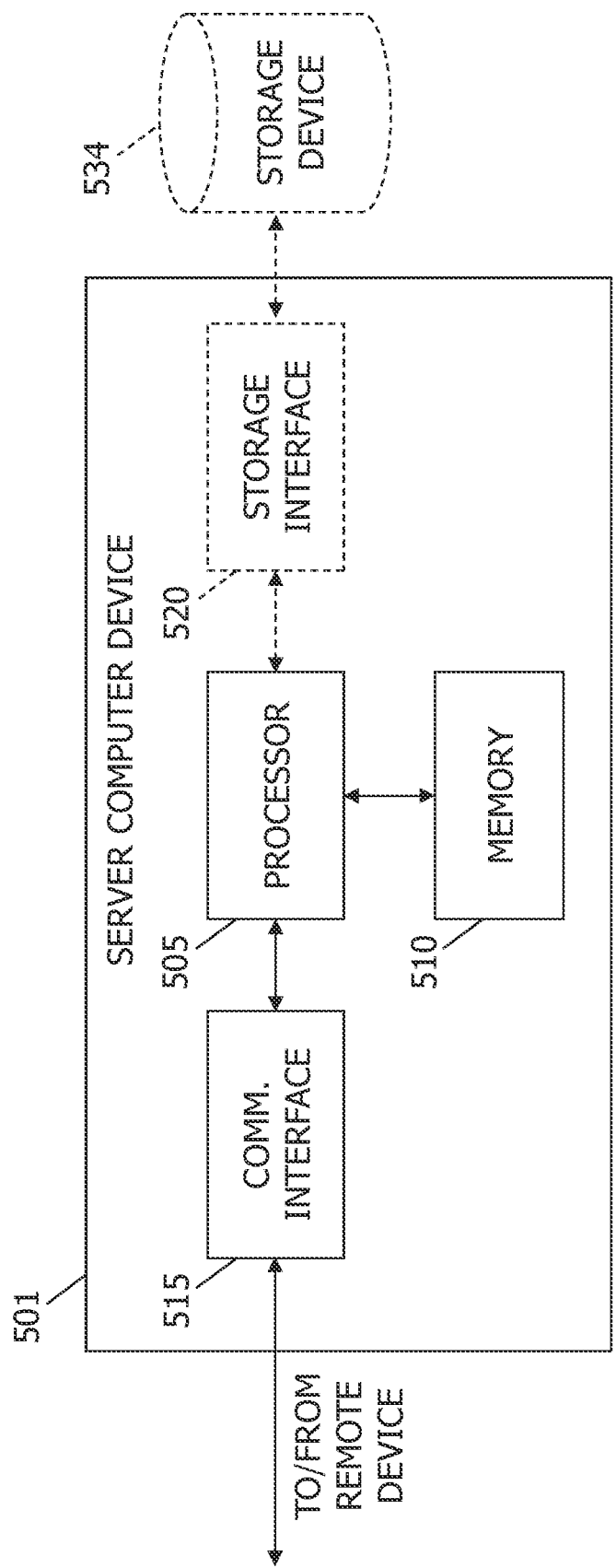

FIG. 5 illustrates an example configuration of a server computer device 501 in accordance with one embodiment of the present disclose. Server computer device 501 may include, but is not limited to, authentication computing device 312 and/or database server 314 (shown in FIG. 3). Server computer device 501 also includes a processor 505 for executing instructions. Instructions may be stored in a memory area 510. Processor 505 may include one or more processing units (e.g., in a multi-core configuration).

Processor 505 is operatively coupled to a communication interface 515 such that server computer device 501 is capable of communicating with a remote device such as another server computer device 501 or client sub-systems 318, 320, and 322 (shown in FIG. 3). For example, communication interface 515 may receive requests from client sub-systems 318, 320, and 322 via the Internet, as illustrated in FIG. 3.

Processor 505 may also be operatively coupled to a storage device 534. Storage device 534 is any computer-operated hardware suitable for storing and/or retrieving data, such as, but not limited to, data associated with database 328 (shown in FIG. 3). In some embodiments, storage device 534 is integrated in server computer device 501. For example, server computer device 501 may include one or more hard disk drives as storage device 534. In other embodiments, storage device 534 is external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Figure 8:
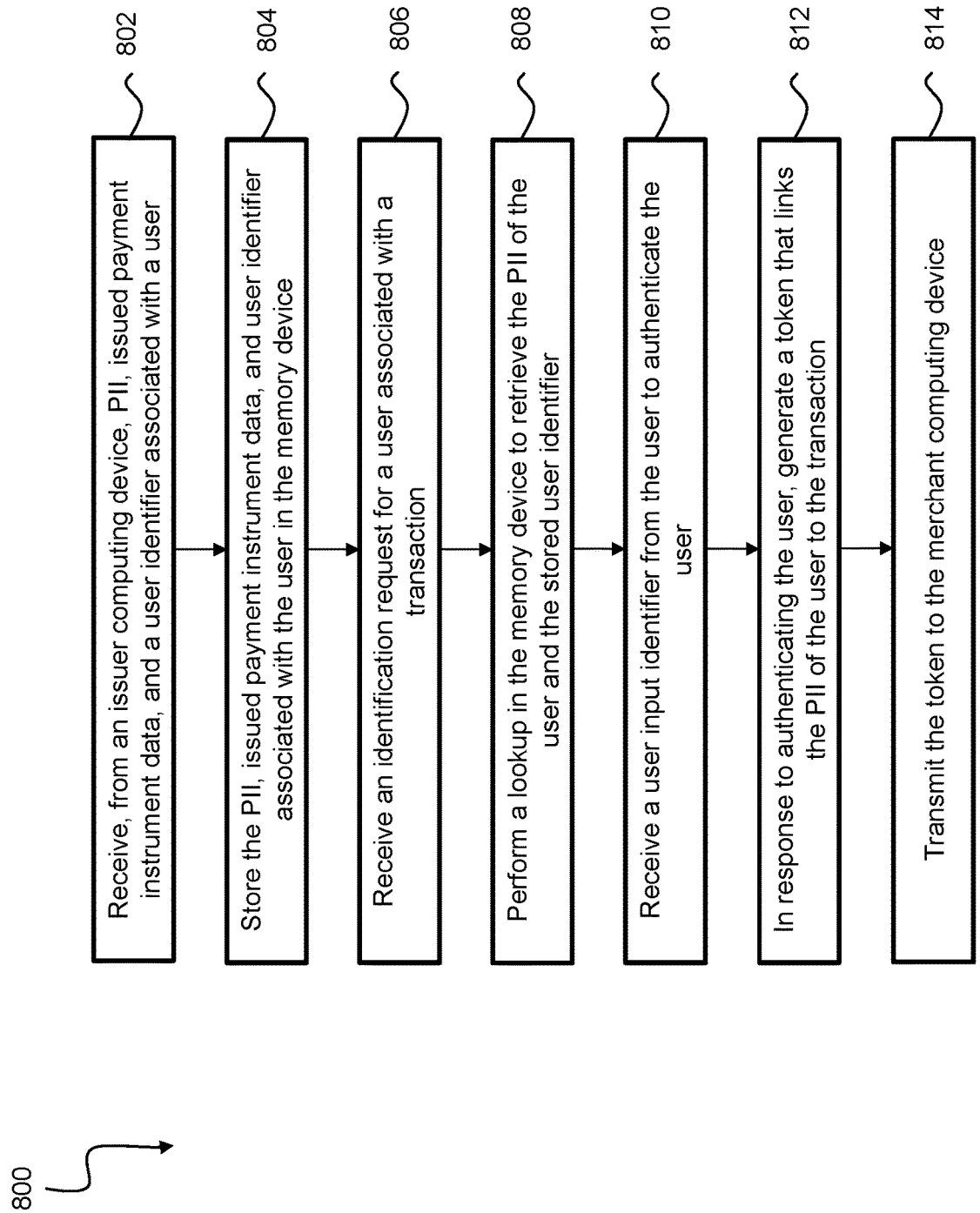

Processor 505 executes computer-executable instructions for implementing aspects of the disclosure. In some embodiments, the processor 505 is transformed into a special purpose microprocessor by executing computer-executable instructions or by otherwise being programmed. For example, the processor 505 is programmed with the instructions, such as illustrated in FIG. 8.

Figure 6:
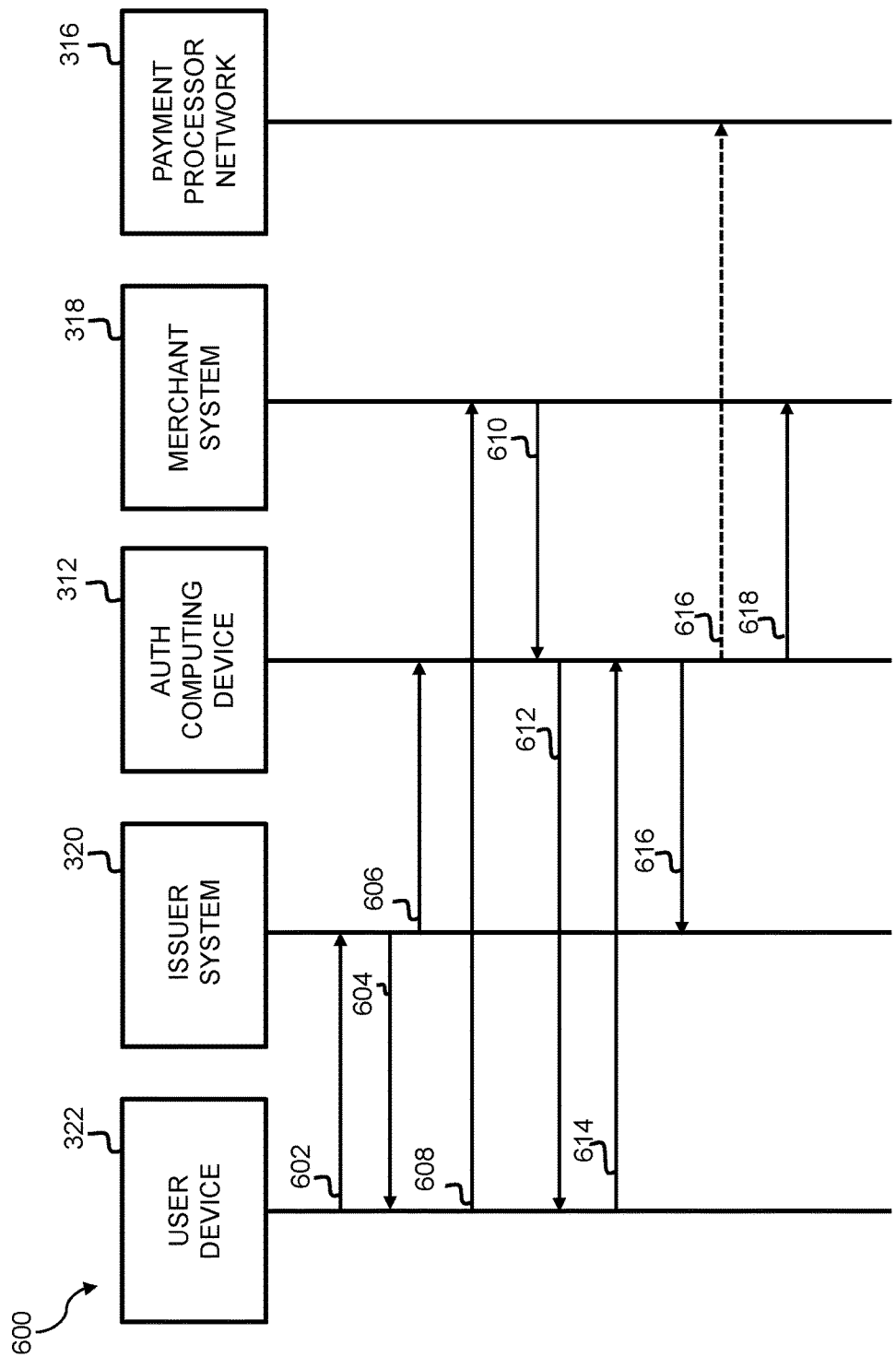

FIG. 6 is a data flow diagram 600 illustrating an example flow of data within authentication platform 300 of FIG. 3 including transmitting a token linked to personally identifying information (PII) of a user to a merchant in accordance with one example embodiment of the present disclosure.

Issuer system 320 receives enrollment data 602 from user device 322. Enrollment data 602 is received when a user associated with user device 322 requests that a payment instrument (e.g., checks and/or e-checks) be issued by an issuer associated with issuer system 320. This may happen when a user opens a checking account with an issuer bank, or when the user registers with the issuer bank for this authentication service and their existing checking account. Enrollment data 602 includes the payment instrument order and user data. User data includes (i) user PII data including user name, user address, driver's license number, user phone number, and social security number, (ii) user identification data including user biometric information and/or a personal identification number (PIN), and (iii) other data including login username/password. Once the payment instrument order is processed, issuer system 320 sends an issued payment instrument 604 to the user and/or user device 322.

Issued payment instrument 604 is checks and/or e-checks. In one embodiment, issued payment instrument 604 is substantially similar to check 200 (shown in FIG. 2). In another embodiment, issuer payment instrument 604 is substantially similar to check 200 (shown in FIG. 2) except that issued payment instrument 604 may not include account holder's name 208, check number 210, issuing bank routing number 212, account number 214, and/or address field 216. Instead, issued payment instrument 604 may include a quick response (QR) code and/or a user-specific number/code that links issued payment instrument 604 to the user, and more specifically, to a payment account of the user issued by the issuer associated with issuer system 320. Accordingly, issued payment instrument 604 may not include any PII of the user, such that authentication computing device 312 processes payment transactions initiated with issued payment instrument 604 without any PII of the user being known to merchant/merchant system 318.

After issuer system 320 issues payment instrument 604, issuer system 320 transmits registration information 606 to authentication computing device 312. Registration information 606 includes issued payment instrument data (e.g., issued check numbers, account numbers associated with the issued payment instruments, check identifiers including the QR code, the user-specific number/code, etc.) and user data (e.g., the PII data and the user identifier data). In some embodiments, authentication computing device 312 links the issued payment instrument data, the PII data, and the user identifier data together, and stores the linked registration information 606 in a database (e.g., database 328 shown in FIG. 3). In other embodiments, authentication computing device 312 is in communication with a database of issuer system 320 that stores the linked registration information 606.

When a user (e.g., associated with user device 322) initiates a transaction with a merchant (e.g., associated with merchant system 318), the user presents an issued payment instrument 608 to the merchant. Merchant system 318 transmits authentication request 610 to authentication computing device 312 to authenticate the user associated with issued payment instrument 608. Authentication request 610 includes a picture of issued payment instrument 608, a scan of issued payment instrument 608 (e.g., scanning a QR code, a barcode, and/or unique account identifier), and/or any other suitable method for transmitting data associated with payment instrument 608. In some embodiments, authentication request 610 also includes transaction data (e.g., transaction amount, transaction data, merchant identifier, merchant location, etc.). From authentication request 610, authentication computing device 312 determines payment method data associated with issued payment instrument 608. For example, if authentication request 610 includes a picture of issued payment instrument 608, authentication computing device 312 may determine an account number from the picture. Further, for example, if identification request 610 includes a scan of a QR code of issued payment instrument 608, authentication computing device 312 may determine an account number associated with the QR code. Authentication computing device 312 then performs a lookup (e.g., of database 328) to retrieve the PII of a user associated with issued payment instrument 608.

Further, authentication computing device 312 performs another lookup (e.g., of database 328) to determine a user identifier associated with issued payment method 608. Once the user associated with issued payment instrument 608 is determined, a prompt 612 is sent to user device 322 associated with the user. Prompt 612 instructs the user to enter a user identifier 614 to be transmitted to authentication computing device 312 to verify that the user who initiated the transaction with the merchant (with issued payment instrument 608) is actually the legitimate user associated with issued payment instrument 608. User identifier 614 includes a personal identification number (PIN) and/or biometric data (e.g., a fingerprint scan, a face scan, a retina scan, etc.). User identifier 614 can be input into a point of sale (POS) device of merchant system 318 and/or user device 322 (e.g., through authentication application 324). Accordingly, merchant system 318 and/or user device 322 transmit user identifier 614 to authentication computing device 312. Authentication computing device 312 receives user identifier 614 and compares user identifier 614 to a stored user identifier of the user determined to be associated with issued payment instrument 608. If user identifier 614 matches the stored user identifier, authentication computing device 312 generates an authentication message 616 and transmits authentication message 616, data associated with issued payment instrument 608, and/or transaction data to issuer system 320 and/or payment processor network 316 for further processing (e.g., authorization, clearing, and transferring of funds). In some embodiments, issuer system 320, either itself or through authentication computing device 312/payment processor network 316, automatically authorizes and clears the transaction in response to receiving authentication message 616.

In some embodiments, authentication computing device 312 cannot verify that user identifier 614 matches the stored user identifier of the user determined to be associated with issued payment instrument 608. For example, user identifier 614 and the stored user identifier may not match or the user that presented issued payment instrument 608 may not enter or deny entering user identifier 614. In these embodiments, authentication computing device 312 may provide notifications (not shown) to payment processor network 316, merchant system 318, and/or issuer system 320 indicating that the user cannot be verified. Therefore, issued payment instrument 608 can be denied before issued payment instrument 608 is processed, reducing fraudulent transactions for each of payment processor network 316, merchant system 318, and issuer system 320.

Further, upon retrieving the PII, authentication computing device 312 generates and transmits a token 618 to merchant system 318 that links the PII of the user to the transaction initiated with the merchant. In some embodiments, authentication computing device 312 only generates and transmits token 618 after the user has been authenticated. In other embodiments, authentication computing device 312 generates and transmits token 618 while the user is being authenticated.

Authentication computing device 312 stores token 618 (e.g., in database 328). In some embodiments, token 618 selectively allows merchant system 318 to access the PII if the transaction cannot be processed (e.g., if the user does not have enough funds in the payment account associated with issued payment instrument 608). In these embodiments, merchant system 318 can use token 618 to request access to the PII of the user of the transaction through authentication computing device 312. Authentication computing device 312 may perform a lookup (e.g., of database 328) of token 618 to determine the transaction associated with token 618 and therefore the PII of the user of the transaction. In other embodiments, token 618 automatically allows electronic access to the PII for merchant system 318. Accordingly, authentication computing device 312 ensures that the merchant associated with merchant system 318 can electronically access PII of the user without the user having to physically provide the PII to the merchant and without the merchant storing the PII. Therefore, the PII of the user is protected by authentication computing device 312, and the merchant is protected by authentication computing device 312 because the merchant can access the PII of the user if the transaction cannot be processed.

FIG. 7 is a data flow diagram 700 illustrating an example flow of data within authentication platform 300 of FIG. 3 including authenticating a user of a check in a user-to-user transaction in accordance with another example embodiment of the present disclosure.

As described with respect to FIG. 6, issuer system 320 receives enrollment data 602 from user device 322 (e.g., payor user device 322). Enrollment data 602 is received when a user associated with payor user device 322 requests that a payment instrument (e.g., checks and/or e-checks) be issued by an issuer associated with issuer system 320.

Enrollment data 602 includes the payment instrument order and user data. User data includes (i) user PII data including user name, user address, driver's license number, user phone number, and social security number, (ii) user identification data including user biometric information and/or a personal identification number (PIN), and (iii) other data including login username/password. Once the payment instrument order is processed, issuer system 320 sends an issued payment instrument 604 to the user and/or payor user device 322. Issued payment instrument 604 is checks and/or e-checks. In one embodiment, issued payment instrument 604 is substantially similar to check 200 (shown in FIG. 2). In another embodiment, issuer payment instrument 604 is substantially similar to check 200 (shown in FIG. 2) except that issued payment instrument 604 may not include account holder's name 208, check number 210, issuing bank routing number 212, account number 214, and/or address field 216. Instead, issued payment instrument 604 may include a quick response (QR) code and/or a user-specific number/code that links issued payment instrument 604 to the user, and more specifically, to a payment account of the user issued by the issuer associated with issuer system 320. Accordingly, issued payment instrument 604 may not include any PII of the user, such that authentication computing device 312 processes payment transactions initiated with issued payment instrument 604 without any PII of the user being known to merchant/merchant system 318.

After issuer system 320 issues payment instrument 604, issuer system 320 transmits registration information 606 to authentication computing device 312. Registration information 606 includes issued payment instrument data (e.g., issued check numbers, account numbers associated with the issued payment instruments, check identifiers including the QR code, the user-specific number/code, etc.) and user data (e.g., the PII data and the user identifier data). In some embodiments, authentication computing device 312 links the issued payment instrument data, the PII data, and the user identifier data together, and stores the linked registration information 606 in a database (e.g., database 328 shown in FIG. 3). In other embodiments, authentication computing device 312 is in communication with a database of issuer system 320 that stores the linked registration information 606.

When a payor (e.g., associated with payor user device 322) initiates a transaction with a payee (e.g., associated with payee user device 322), the payor presents an issued payment instrument 702 to the payee. The payee transmits authentication request 704 to authentication computing device 312 for processing. In some embodiments, authentication request 704 is transmitted to authentication computing device 312 from payee user device 322 (e.g., when the payee electronically deposits issued payment instrument 702). In other embodiments, authentication request 704 is transmitted to authentication computing device 312 from a financial institution of the payee. Authentication request 704 includes a picture of issued payment instrument 608, a scan of issued payment instrument 608 (e.g., scanning a QR code, a barcode, and/or unique account identifier), and/or any other suitable method for transmitting data associated with payment instrument 608. In some embodiments, authentication request 610 also includes transaction data (e.g., transaction amount, transaction date, etc.). From authentication request 704, authentication computing device 312 determines payment method data associated with issued payment instrument 608. For example, if authentication request 704 includes a picture of issued payment instrument 608, authentication computing device 312 may determine an account number from the picture. Further, for example, if identification request 704 includes a scan of a QR code of issued payment instrument 608, authentication computing device 312 may determine an account number associated with the QR code. In some embodiments, authentication computing device 312 then performs a lookup (e.g., of database 328) to retrieve the PII of the payor associated with issued payment instrument 608.

Further, authentication computing device 312 performs another lookup (e.g., of database 328) to determine a user identifier associated with issued payment method 608. Once the user associated with issued payment instrument 608 is determined, a prompt 706 is sent to payor user device 322 associated with the user. Prompt 706 instructs the user to enter a user identifier 708 to be transmitted to authentication computing device 312 to verify that the payor is actually associated with issued payment instrument 608. User identifier 708 includes a personal identification number (PIN), biometric data (e.g., a fingerprint scan, a face scan, a retina scan, etc.), and/or another response to verify the user. User identifier 708 can be input into payor user device 322 (e.g., through authentication application 324). For example, prompt 706 may be a message (e.g., SMS message or push notification) sent to payor user device 322 instructing payor to verify that the payor presented issued payment method 608 to the payee. User identifier 708 may be a biometric data input, a PIN input, or a "YES" response message transmitted in response to prompt 706. Authentication computing device 312 receives user identifier 708 and compares user identifier 708 to a stored user identifier of the payor. If user identifier 708 matches the stored user identifier, authentication computing device 312 generates an authentication message 710 and transmits authentication message 710, data associated with issued payment instrument 608, and/or transaction data to issuer system 320 and/or payment processor network 316 for further processing (e.g., authorization, clearing, and transferring of funds). In some embodiments, issuer system 320, either itself or through authentication computing device 312/payment processor network 316, automatically authorizes and clears the transaction in response to receiving authentication message 710.

In some embodiments, authentication computing device 312 cannot verify that user identifier 708 matches the stored user identifier of the payor. For example, user identifier 708 and the stored user identifier may not match or the payor may respond to prompt 706 indicating that the payor did not present the payee with issued payment method 608 (e.g., if issued payment method 608 has been stolen or otherwise fraudulently used). In these embodiments, authentication computing device 312 may provide notifications (not shown) to payment processor network 316 and/or issuer system 320 indicating that the user cannot be verified. Therefore, issued payment instrument 608 can be denied before issued payment instrument 608 is processed, reducing fraudulent transactions for the payor, payment processor network 316, and issuer system 320.

In some embodiments, the payee also request PII of the payor in case the transaction initiated with issued payment method 608 cannot be processed. Authentication computing device 312 retrieves the PII of the payor (e.g., from database 328, shown in FIG. 3) and generates and transmits a token 712 to payee user device 322 that links the PII of the payor to the transaction initiated with the payee. In some embodiments, authentication computing device 312 only generates and transmits token 618 after the payor has been authenticated. In other embodiments, authentication computing device 312 generates and transmits token 618 while the payor is being authenticated.

Authentication computing device 312 stores token 712 (e.g., in database 328). In some embodiments, token 712 selectively allows payee user device 322 to access the PII if the transaction cannot be processed (e.g., if the payor does not have enough funds in the payment account associated with issued payment instrument 608). In these embodiments, payee user device can use token 712 to request access to the PII of the payor of the transaction through authentication computing device 312. Authentication computing device 312 may perform a lookup (e.g., of database 328) of token 712 to determine the transaction associated with token 712 and therefore the PII of the payor of the transaction. In other embodiments, token 712 automatically allows electronic access to the PII for payee user device 322. Accordingly, authentication computing device 312 ensures that the payee can electronically access PII of the payor without the payor having to physically provide the PII to the payee and without the payee storing the PII. Therefore, the PII of the payor is protected by authentication computing device 312, and the payee is protected by authentication computing device 312 because the payee can access the PII of the payor if the transaction cannot be processed.

FIG. 8 is a flowchart of an example process 800 for electronically sending personally identifying information (PII) of a user to a merchant in accordance with one embodiment of the disclosure. In some embodiment, process 800 is implemented by authentication computing device 312 (shown in FIG. 3).

Process 800 includes receiving 802, from an issuer computing device, PII, issued payment instrument data, and a user identifier associated with a user. The PII, issued payment instrument data, and the user identifier associated with the user are stored 804 in a memory device (e.g., database 328, shown in FIG. 3). Process 800 further includes receiving 806 from a merchant computing device, an identification request for a user associated with a transaction. The identification request includes payment instrument data associated with a check used in the transaction. A lookup is performed 808 in the memory device to retrieve the PII of the user from the memory device and the stored user identifier associated with the received payment instrument data. Process 800 further includes receiving 810 a user input identifier from the user to authenticate the user. In response to authenticating the user, a token is generated 812 that links the PII of the user to the transaction. Further, the token is transmitted 814 to the merchant computing device.

Figure 9:
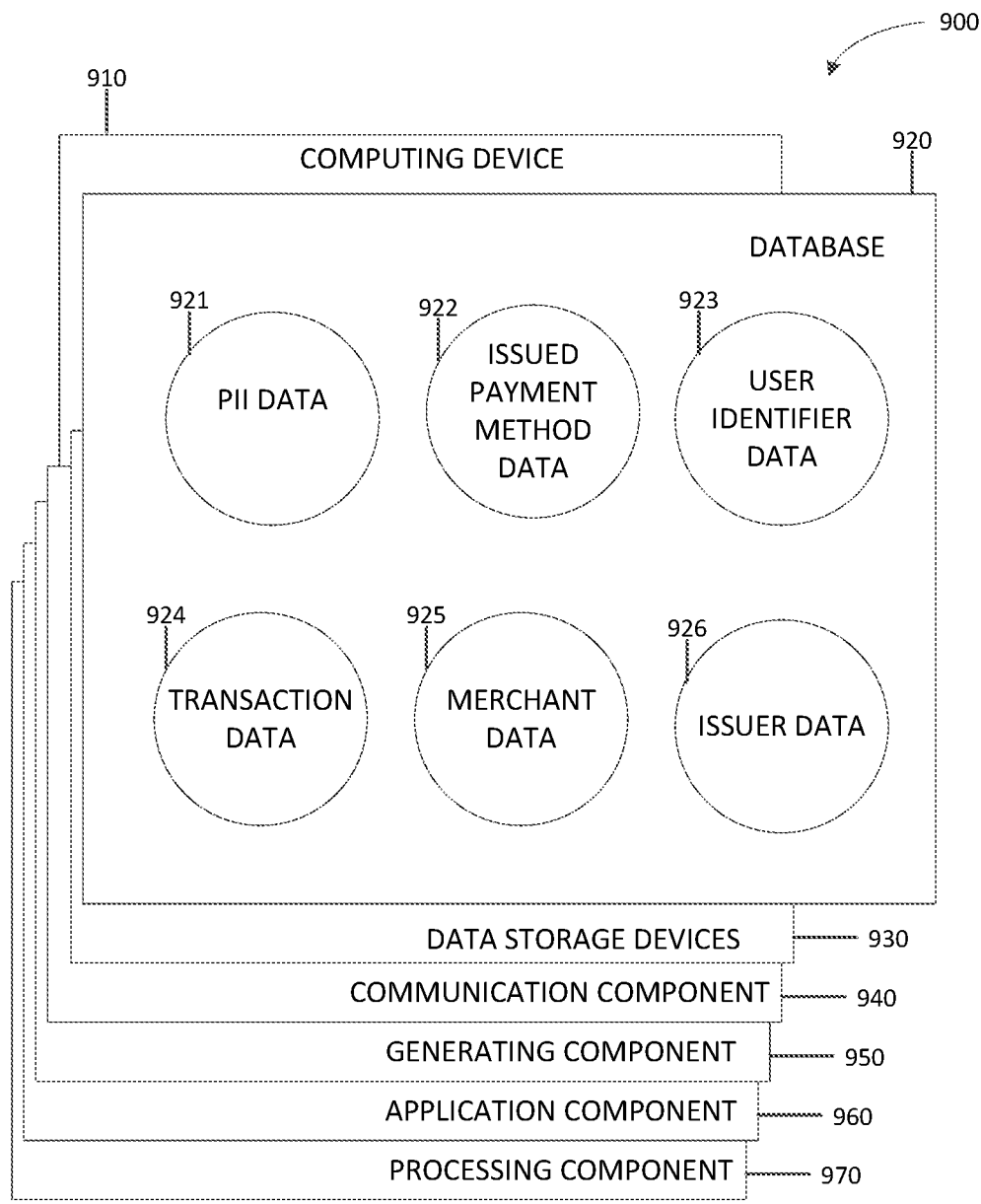

FIG. 9 is a diagram of components 900 of one or more example computing devices 910 (e.g., authentication computing device 312 shown in FIG. 3) that may be used in CI platform 300 shown in FIG. 4. Computing device 910 includes a database 920 (e.g., database 328 shown in FIG. 3), data storage devices 930, a communication component 940, a generating component 950, an application component 960, and a processing component 970. Database 920 and data storage device 930 may store information such as, for example, personally identifying information (PII) data 921 (e.g., user name, user address, user driver's license number, user phone number, user social security number, etc.), issued payment instrument data 922 (e.g., issued check numbers, issued payment account numbers, etc.), user identifier data 923 (e.g., PIN number and biometric data), transaction data 924 (e.g., data related to transactions processed by one or more payment processing networks including merchant identifiers, merchant locations, transaction amounts, transaction dates, etc.), merchant data 925, issuer data 926, and/or other data. Database 920 is coupled to several separate components within computing device 910, which perform specific tasks.

Communication component 940 facilitates communication between payment network systems (e.g., payment network system 316, shown in FIG. 3), merchant systems (e.g., merchant system 318, shown in FIG. 3), issuer systems (e.g., issuer system 320, shown in FIG. 3), and/or user systems (e.g., user system 322, shown in FIG. 3). Generating component 950 generates identification queries, PII associated with users associated with transaction, token including the PII, and other data/queries as disclosed herein. Application component 960 supports Authentication application 324 (shown in FIG. 3) and provides prompts to the user when user identification is required. Processing component 970 processes received and stored data such that computing device 910 can function (e.g., electronically transmit PII of a user to a merchant) as described herein.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computing system for electronically securing sensitive data transmitted to a remote location, the computing system comprising at least one processor in communication with at least one memory device, the at least one processor programmed to:
   receive, from an issuer computing device, personally identifying information (PII) of a user, issued payment instrument data, and a user identifier associated with the user, wherein the issued payment instrument data includes data associated with a plurality of physical checks associated with the user, and wherein the PII includes sensitive information of the user;
   store the PII, the issued payment instrument data, and the user identifier in the at least one memory device;
   in response to a physical check of the plurality of physical checks being used as a payment instrument for a transaction, receive, from a merchant computing device associated with the merchant, an identification request for the user associated with the transaction, the identification request including payment instrument data associated with the physical check, the payment instrument data including non-sensitive information of the user;
   perform in real-time a lookup in the at least one memory device using the received payment instrument data to retrieve the stored PII of the user and the stored user identifier associated with the received payment instrument data;
   in response to retrieving the stored PII and the stored user identifier, cause to be displayed, in real-time on a user computing device associated with the user, a message requesting the user to input an identifier into the user computing device to authenticate the user, the inputted identifier different from the PII;
   receive, from the user computing device, the inputted identifier by the user;
   authenticate in real-time the user by matching the inputted identifier to the stored user identifier;
   in response to authenticating the user, generate in real-time a unique token that links the PII of the user to the transaction, masks the PII, and automatically provides access to the merchant computing device to the at least one memory device storing the PII of the user when completion of the transaction fails;
   transmit the unique token to the merchant computing device to complete the transaction utilizing the physical check as the payment instrument;
   in response to failing completion of the transaction, receive, from the merchant computing device, the unique token; and
   in response to receiving the unique token, automatically provide access to the merchant computing device to the at least one memory device storing the PII of the user, such that the merchant computing device provides the PII to the merchant.

2. The computing system of claim 1, wherein the at least one processor is further programmed to:
   store the unique token in the at least one memory device.

3. The computing system of claim 1, wherein the inputted identifier is at least one of a personal identification number (PIN) or biometric data.

4. The computing system of claim 1, wherein the at least one processor is further programmed to:
   generate an authentication message when the inputted identifier and the stored user identifier match; and
   transmit the authentication message and the received payment instrument data to the issuer computing device.

5. The computing system of claim 1, wherein the at least one processor is further programmed to:
   automatically authorize and clear the transaction on behalf of the issuer computing device.

6. The computing system of claim 1, wherein the at least one processor is further programmed to:
   receive, from the merchant computing device, a payment instrument identifier associated with the payment instrument, wherein the payment instrument identifier includes at least one of an account number, a QR code, or a code unique to the payment instrument; and
   determine the payment instrument data using the payment instrument identifier.

7. The computing system of claim 1, wherein the PII includes at least one of a name, an address, a social security number, a driver's license number, or a phone number, and wherein the issued payment instrument data includes at least one of a payment account number, a check number, or a deposit account number.

8. A method implemented by a computing system for electronically securing sensitive data transmitted to a remote location, the computing system including at least one processor in communication with at least one memory device, the method comprising:
   receiving, from an issuer computing device, personally identifying information (PII) of a user, issued payment instrument data, and a user identifier associated with the user, wherein the issued payment instrument data includes data associated with a plurality of physical checks associated with the user, and wherein the PII includes sensitive information of the user;
   storing the PII, the issued payment instrument data, and the user identifier in the at least one memory device;
   in response to a physical check of the plurality of physical checks being used as a payment instrument for a transaction, receiving, from a merchant computing device associated with the merchant, an identification request for the user associated with the transaction, the identification request including payment instrument data associated with the physical check, the payment instrument data including non-sensitive information of the user;
   performing in real-time a lookup in the at least one memory device using the received payment instrument data to retrieve the stored PII of the user and the stored user identifier associated with the received payment instrument data;
   in response to retrieving the stored PII and the stored user identifier, causing to be displayed, in real-time on a user computing device associated with the user, a message requesting the user to input an identifier into the user computing device to authenticate the user, the inputted identifier different from the PII;

receiving, from the user computing device, the inputted identifier by the user;

authenticate in real-time the user by matching the inputted identifier to the stored user identifier;

in response to authenticating the user, generating in real-time a unique token that links the PII of the user to the transaction, masks the PII, and automatically provides access to the merchant computing device to the at least one memory device storing the PII of the user when completion of the transaction fails;

transmitting the unique token to the merchant computing device to complete the transaction utilizing the physical check as the payment instrument;

in response to failing completion of the transaction, receiving, from the merchant computing device, the unique token; and in response to receiving the unique token, automatically providing access to the merchant computing device to the at least one memory device storing the PII of the user, such that the merchant computing device provides the PII to the merchant.

9. The method of claim 8 further comprising:
storing the unique token in the at least one memory device.

10. The method of claim 8, wherein the inputted identifier is at least one of a personal identification number (PIN) or biometric data.

11. The method of claim 8 further comprising:
generating an authentication message when the inputted identifier and the stored user identifier match; and
transmitting the authentication message and the received payment instrument data to the issuer computing device.

12. The method of claim 8 further comprising:
automatically authorizing and clearing the transaction on behalf of the issuer computing device.

13. The method of claim 8 further comprising:
receiving, from the merchant computing device, a payment instrument identifier associated with the payment instrument, wherein the payment instrument identifier includes at least one of an account number, a QR code, or a code unique to the payment instrument; and
determining the payment instrument data using the payment instrument identifier.

14. The method of claim 8, wherein the PII includes at least one of a name, an address, a social security number, a driver's license number, or a phone number, and wherein the issued payment instrument data includes at least one of a payment account number, a check number, or a deposit account number.

15. At least one non-transitory computer-readable medium having computer-executable instructions thereon for electronically securing sensitive data transmitted to a remote location using a computing system including at least one processor in communication with at least one memory device, wherein the computer-executable instructions, when executed by the at least one processor, cause the at least one processor to:
receive, from an issuer computing device, personally identifying information (PII) of a user, issued payment instrument data, and a user identifier associated with the user, wherein the issued payment instrument data includes data associated with a plurality of physical checks associated with the user, and wherein the PII includes sensitive information of the user;

store the PII, the issued payment instrument data, and the user identifier in the at least one memory device;

in response to a physical check of the plurality of physical checks being used as a payment instrument for a transaction, receive, from a merchant computing device associated with the merchant, an identification request for the user associated with the transaction, the identification request including payment instrument data associated with the physical check, the payment instrument data including non-sensitive information of the user;

perform in real-time a lookup in the at least one memory device using the received payment instrument data to retrieve the stored PII of the user and the stored user identifier associated with the received payment instrument data;

in response to retrieving the stored PII and the stored user identifier, cause to be displayed, in real-time on a user computing device associated with the user, a message requesting the user to input an identifier into the user computing device to authenticate the user, the inputted identifier different from the PII;

receive, from the user computing device, the inputted identifier by the user;

authenticate in real-time the user by matching the inputted identifier to the stored user identifier;

in response to authenticating the user, generate in real-time a unique token that links the PII of the user to the transaction, masks the PII, and automatically provides access to the merchant computing device to the at least one memory device storing the PII of the user when completion of the transaction fails;

transmit the unique token to the merchant computing device to complete the transaction utilizing the physical check as the payment instrument;

in response to failing completion of the transaction, receive, from the merchant computing device, the unique token; and in response to receiving the unique token, automatically provide access to the merchant computing device to the at least one memory device storing the PII of the user, such that the merchant computing device provides the PII to the merchant.

16. The computer-readable medium of claim 15, wherein the computer-executable instructions further cause the at least one processor to:
store the unique token in the at least one memory device.

17. The computer-readable medium of claim 15, wherein the inputted identifier is at least one of a personal identification number (PIN) or biometric data.

18. The computer-readable medium of claim 15, wherein the computer-executable instructions further cause the at least one processor to:
generate an authentication message when the inputted identifier and the stored user identifier match; and
transmit the authentication message and the received payment instrument data to the issuer computing device.

19. The computer-readable medium of claim 15, wherein the computer-executable instructions further cause the at least one processor to:
automatically authorize and clear the transaction on behalf of the issuer computing device.

20. The computer-readable medium of claim 15, wherein the computer-executable instructions further cause the at least one processor to:
- receive, from the merchant computing device, a payment instrument identifier associated with the payment instrument, wherein the payment instrument identifier includes at least one of an account number, a QR code, or a code unique to the payment instrument; and
- determine the payment instrument data using the payment instrument identifier.

* * * * *